(12) United States Patent
Nghiem et al.

(10) Patent No.: US 7,955,687 B2
(45) Date of Patent: Jun. 7, 2011

(54) ANTIFOULING MATERIAL AND PRODUCTION METHOD THEREOF

(75) Inventors: Bernard Nghiem, Arsy (FR); Georges Zagdoun, La Garenne Colombes (FR); Elin Sondergard, Bourg la Reine (FR); Ronan Garrec, Asnieres sur Seine (FR); Eddy Royer, Asnieres (FR); Andriy Kharchenko, Palaiseau (FR); Anne Lelarge, Paris (FR); Etienne Barthel, Bourg la Reine (FR)

(73) Assignee: Saint-Gobain Glass France, Courbevoie (FR)

( * ) Notice: Subject to any disclaimer, the term of this patent is extended or adjusted under 35 U.S.C. 154(b) by 468 days.

(21) Appl. No.: 12/090,367

(22) PCT Filed: Oct. 20, 2006

(86) PCT No.: PCT/FR2006/051074
§ 371 (c)(1), (2), (4) Date: Apr. 16, 2008

(87) PCT Pub. No.: WO2007/045805
PCT Pub. Date: Apr. 26, 2007

(65) Prior Publication Data
US 2008/0241479 A1  Oct. 2, 2008

(30) Foreign Application Priority Data

Oct. 21, 2005 (FR) ...................................... 05 53203
Jul. 7, 2006 (FR) ...................................... 06 52877

(51) Int. Cl.
*B32B 3/00* (2006.01)
*B32B 17/06* (2006.01)
*B32B 15/00* (2006.01)
*B32B 9/00* (2006.01)
*B32B 19/00* (2006.01)
*C23C 8/00* (2006.01)
*C23C 10/10* (2006.01)
*C23C 16/24* (2006.01)
*C23C 16/30* (2006.01)

(52) U.S. Cl. ........ 428/172; 428/166; 428/426; 428/428; 428/432; 428/697; 428/701; 428/702; 427/585; 427/588; 427/589

(58) Field of Classification Search .................. 428/166, 428/172, 426, 428, 432, 697, 702, 701; 427/497, 427/582, 583, 584, 585, 588, 589, 593, 124
See application file for complete search history.

(56) References Cited

U.S. PATENT DOCUMENTS

| | | | | |
|---|---|---|---|---|
| 6,124,026 A | * | 9/2000 | McCurdy et al. | 428/216 |
| 6,436,542 B1 | * | 8/2002 | Ogino et al. | 428/432 |

FOREIGN PATENT DOCUMENTS

| | | |
|---|---|---|
| EP | 0 820 967 | 1/1998 |
| EP | 0 965 571 | 12/1999 |
| EP | 1 066 878 | 1/2001 |
| EP | 1 074 525 | 2/2001 |
| EP | 1 099 671 | 5/2001 |
| EP | 1 398 146 | 3/2004 |
| FR | 2 861 386 | 4/2005 |
| JP | 2001264509 A * | 9/2001 |
| WO | 02 18287 | 3/2002 |
| WO | 2004 086473 | 10/2004 |
| WO | 2005 040056 | 5/2005 |

* cited by examiner

*Primary Examiner* — Jennifer C McNeil
*Assistant Examiner* — Catherine Simone
(74) *Attorney, Agent, or Firm* — Oblon, Spivak, McClelland, Maier & Neustadt, L.L.P.

(57) ABSTRACT

The subject of the invention is the use of a material composed of a substrate equipped with a coating based on titanium oxide surmounted by a thin hydrophilic layer forming at least one part of the outer surface of said material and that is not composed of titanium oxide, as a material that prevents the deposition of mineral soiling on said outer surface in the absence of water runoff.

15 Claims, No Drawings

ANTIFOULING MATERIAL AND PRODUCTION METHOD THEREOF

CROSS-REFERENCE TO RELATED APPLICATIONS

This application is a 371 of PCT/FR06/51074 filed Oct. 20, 2006 and claims the benefit of FR 0553203 filed Oct. 21, 2005 and FR 0652877 filed Jul. 7, 2006.

BACKGROUND OF THE INVENTION

1. Field of the Invention

The present invention relates to the field of materials, in particular glazing panels, which are antisoiling or self cleaning.

2. Description of Related Art

Titanium oxide is known for having photocatalytic properties. In the presence of light, and especially ultraviolet radiation of UV-A type (of which the wavelength is between 320 and 400 nm), titanium oxide has the particular feature of catalyzing the radical degradation reactions of organic compounds. It is known from documents EP-A-850 204 and EP-A-816 466 that titanium oxide also has extremely pronounced hydrophilic properties induced by the same type of radiation. This hydrophilicity, sometimes referred to as "super-hydrophilicity" is characterized by a very small water contact angle, of less than 5°, or even less than 1°. These two properties, photocatalysis on the one hand and super-hydrophilicity on the other hand, give the material containing titanium oxide particularly advantageous properties. Materials, in particular of the ceramic, glass or glass-ceramic type, coated with a thin layer of titanium oxide have, in effect, antisoiling or self cleaning or else ease-of-cleaning properties. A glazing panel covered with a photocatalytic titanium oxide layer degrades the organic soiling which is deposited thereon under the action of sunlight. Mineral soiling is itself partly prevented from being deposited and partly removed owing to the photoinduced super-hydrophilicity of the titanium oxide. Mineral soiling, in certain cases, is in effect caused to be deposited on glazing panels in a form dissolved in raindrops, and precipitates during the evaporation of said drops. Owing to the super-hydrophilicity properties, the water coats and cleans the glazing instead of being deposited thereon in the form of drops, which therefore prevents the deposition of mineral soiling by this mechanism of deposition/evaporation of water drops. As for mineral soiling such as dust which is deposited without the aid of rain, for example under the action of wind, it is quite simply removed by rainwater runoff. The materials obtained therefore allow the removal of organic and mineral soiling under the combined effect of solar radiation and water, in particular rain, runoff.

The materials described previously have, however, a drawback when they are placed in a site protected from the rain or in a geographical zone that very rarely experiences precipitation. Specifically, it has been observed that, placed in an atmosphere rich in mineral soiling and sheltered from the rain, glazing panels covered with photocatalytic titanium oxide and that are super-hydrophilic are gradually covered with mineral soiling, in particular in the form of very adherent dust. After long-term exposure, especially for more than 2 months, or even 4 months, such glazing has a surface that is as dirty as that of a glazing panel devoid of a titanium oxide layer. In the absence of water runoff, the super-hydrophilic titanium oxide surface does not therefore prevent the deposition and adhesion of mineral soiling.

BRIEF SUMMARY OF THE INVENTION

One object of the invention is therefore to overcome these drawbacks by providing a material that prevents the deposition of mineral soiling on its surface, therefore that has little dust accumulation, including in the absence of water runoff. Another object of the invention is to provide a material capable of not being soiled after several months of exposure in sites that are protected from the rain or geographical zones that very rarely experience precipitation.

DETAILED DESCRIPTION OF THE INVENTION

The inventors have discovered that the substrates covered with a titanium oxide layer, itself surmounted by a thin layer of another hydrophilic material, in particular of the type comprising silicon and oxygen, had, completely unexpectedly, the technical effect consisting in preventing the deposition of mineral soiling (therefore dust accumulation) on its surface in the absence of water runoff.

Some of these materials are known and described in several documents. Application WO 2005/040056 describes, for example, a glazing panel covered with a titanium oxide layer surmounted by a thin layer of aluminum-doped silica having a coating capacity and a thickness of 2 nm. The two layers are deposited by a sputtering process then annealed together in order to confer a high photocatalytic activity to the titanium oxide. The upper silica layer has the effect of improving the mechanical strength, in particular the abrasion resistance, of the multilayer. Patent U.S. Pat. No. 6,379,776 also describes a multilayer on glass comprising, in particular, a photocatalytic titanium oxide layer, placed on which is a single layer of $SiO_x$, x being equal to 1 or 2. The latter layer is described as having the effect of preventing the deposition of organic soiling on the surface of the stack, but a possible effect on the deposition of mineral soiling in the absence of water runoff is not disclosed. This patent moreover describes tests carried out outside that demonstrate an absence of soiling deposition after six months of exposure, it being specified that the surface of the samples was subjected to rainwater runoff. Application EP-A-1 074 525 itself describes a structure of the same type, having on its outer surface a thin layer of $SiO_2$ of 10 nm or less, that makes it possible to improve the hydrophilicity of the material without too substantially degrading the performance in terms of photocatalysis. No effect of this overlayer relative to the deposition of mineral soiling in the absence of water runoff is described.

The technical effect presented by this type of material and which has very recently been discovered, consisting in preventing the deposition of mineral soiling on its surface in the absence of water runoff, has therefore never been entertained. It is also surprising as it can in no way be connected to the properties already described in the prior art. The low adhesion of organic soiling is, in effect, a property of low chemical affinity with organic compounds, linked to the hydrophilic nature of the layer and not correlated to the adhesion of mineral soiling. However, the hydrophilic nature alone of a surface does not prevent the adhesion of mineral soiling in the absence of water runoff, as the case of titanium oxide demonstrates.

One subject of the invention is therefore the use of a material composed of a substrate equipped with a coating based on titanium oxide surmounted by a thin hydrophilic layer forming at least one part of the outer surface of said material and that is not composed of titanium oxide, as a material that prevents the deposition of mineral soiling on said outer surface in the absence of water runoff.

The expression "outer surface" should be understood, within the meaning of the present invention, to be a surface in contact with the ambient air, the only surface capable of being soiled.

Without wishing to be tied to any one scientific theory, it seems that the materials used according to the invention, owing to their structural characteristics, do not accumulate dust (or only accumulate a little dust) owing to a mechanism of reducing the friction coefficient between the surface of the material and the mineral soiling, leading to a much easier removal of this soiling, or even to actual antiadhesive properties. This property of little dust accumulation is in any case completely independent of the known properties of photocatalysis and photoinduced hydrophilicity, as the remainder of the description will demonstrate.

Thin Hydrophilic Layer

The thin hydrophilic layer acts in synergy with the titanium oxide, since none of these layers alone produces the technical effect discovered.

In order that this synergistic effect occurs effectively at the surface of the material, the thin hydrophilic layer must preferably have small thicknesses, thicknesses of less than 10 nm, or even 5 nm and in particular of 1 to 2 nm being preferred.

This synergistic effect is maximized and the best performances are obtained when the thin hydrophilic layers are capable of creating, in the presence of ambient moisture and owing to the underlying presence of the titanium oxide, a hydration layer that is not very dense, in particular that is less dense than liquid water, this hydration layer being, in addition, particularly durable, even in the absence of illumination. This particular hydration layer could then have the effect of considerably reducing the friction coefficient between the surface of the thin hydrophilic layer and the mineral soiling. The latter would thus slide much more easily over the outer surface of the material instead of being deposited thereon and adhering thereto. This preferred characteristic is not found in the materials described previously, the materials having this characteristic are also one subject of the present invention.

The thin hydrophilic layer should not be composed of titanium oxide. It may contain some, advantageously in an amount less than 20 mol %, or even 10 mole %. According to one preferred embodiment and in order to obtain very little dust accumulation, it is however free or almost free of titanium oxide.

Another characteristic of the thin hydrophilic layers used according to the invention lies in the high density of hydroxyl (OH) groups at their surface. It appears that the higher this density is, the more pronounced is the technical effect discovered within this scope of the present invention.

Thus, preferred thin hydrophilic layers are based on silicon and oxygen and especially comprise silica ($SiO_2$), in particular doped with atoms such as aluminum (Al) or zirconium (Zr), the latter increasing the density of surface hydroxyl groups. Doping rates ranging from 3 to 15 at % and preferably from 5 to 10 at % are particularly advantageous.

Other thin hydrophilic layers based on silicon and oxygen, such as SiOC, SiON or $SiO_x$, with $x<2$ may also be used according to the invention, but are not preferred as the number of hydroxyl groups generated at the surface is lower than in the case of silica ($SiO_2$). It is the same for layers comprising silicon and oxygen such as silicates of alkali or alkaline-earth metal ions. Thin hydrophilic layers based on alumina ($Al_2O_3$) are also possible.

In order to obtain the lowest possible dust accumulation, the thin hydrophilic layers, especially based on optionally doped silica, are preferably not annealed, that is to say are not subjected to a heat treatment at more than 500° C., or even 200° C., the effect of the heat treatment being precisely to decrease the density of hydroxyl groups at the surface of the layer.

In this context, the thin hydrophilic layers are preferably obtained by a process chosen from sputtering, the sol-gel process and the plasma-enhanced chemical vapor deposition process (PECVD, or APPECVD when it is carried out at atmospheric pressure), these processes being carried out at low temperature.

The annealed thin hydrophilic layers also have little dust accumulation, which seems however to be greater than in the case of the non-annealed layers. This is the case, for example, for the layers obtained by chemical vapor deposition (CVD), this process being generally carried out on a hot substrate, between 500 and 700° C.

The thin hydrophilic layers may be covering (continuous) and form in this case the whole of the outer surface of the material. They may alternatively not be completely covering, a discontinuous layer, for example in the form of islands that are separated or joined together, that make it possible to obtain a particularly high photocatalytic activity. In this case, the outer surface of the material comprises the underlying titanium oxide in the parts not covered by the hydrophilic layer.

According to certain embodiments, the thin hydrophilic layer may be an integral part of the coating based on titanium oxide and constitute the outermost surface thereof, as explained in the remainder of the text.

Coating Based on Titanium Oxide

The coating based on titanium oxide may be exclusively composed of titanium oxide (apart from inevitable impurities). The titanium oxide may be amorphous or have an at least partially crystalline structure, especially in anatase or rutile form. The technical effect discovered does not seem a priori to have a connection with the photocatalytic activity since amorphous titanium oxide coatings, the photocatalytic activity of which is extremely low or even nonexistent, also prevent the deposition and adhesion of mineral soiling in the absence of water runoff. Other not very active coatings may therefore also be used, such as very thin titanium oxide coatings, for example having a thickness of 1 to 5 nm. A layer of crystalline titanium oxide in anatase form, in particular having a thickness greater than 5 nm, is however preferred in order to give the material a sufficient photocatalytic activity to effectively degrade the organic soiling. Preferred thicknesses are thus from 5 to 20 nm, the larger thicknesses possibly generating an undesirable coloring and inducing longer deposition times. The presence of the thin hydrophilic layer, insofar as its thickness is not greater than a few nanometers, in particular 5 nm and especially 2 nm, does not decrease the photocatalytic activity of the material, and even seems sometimes to increase it. Examples of particularly advantageous titanium oxide coatings in the context of the present invention are, for example, described in patent application EP-A-850 204 incorporated by reference in the present application.

The coatings based on titanium oxide may be formed by various deposition processes, for example by the process of chemical vapor deposition (CVD, as described in the aforementioned application EP 850 204), by the sputtering process (application FR 2 814 094, incorporated by reference into the present text, presents one particular method thereof), or by "sol-gel" type processes.

According to one embodiment of the invention, the titanium oxide of the coating based on titanium oxide is predominantly, or even completely, amorphous. In this case, the material composed of a substrate thus coated is novel and constitutes one subject of the present invention. It may, in particular, be a substrate coated by a layer of titanium oxide then by a layer of silica, the two layers being obtained successively by the sputtering process (in particular assisted by a magnetic field—magnetron sputtering process) and not undergoing annealing after the deposition, that is to say no heat treatment at more than 500° C., in particular 200° C. Another subject of the invention is therefore a process for obtaining such a material, comprising successive steps of deposition by sputtering of a coating based on titanium oxide and of a thin layer based on silicon and oxygen, but not comprising an annealing step after the deposition.

Mixed Layers

The coating based on titanium oxide may also comprise titanium oxide mixed with another compound, especially another oxide. Mixed oxides of titanium and one or more oxides chosen from silicon, aluminum, magnesium or tin oxides constitute possible embodiments of the invention.

The titanium oxide may, in particular, be present in the form of particles that are discernible and at least partially crystalline dispersed in a preferably mineral or inorganic binder. This binder is advantageously based on silica, for example in the form of an alkali metal silicate or of silica obtained by the sol-gel process. The coatings based on titanium oxide described in applications WO 97/10185 or WO 99/44954 constitute coatings of this type that can be applied to the present invention. Coatings based on titanium oxide particles of nanoscale size dispersed in a binder of mesoporous type such as described in application WO 03/87002 are particularly advantageous when a very high photocatalytic activity is required, especially for applications inside buildings.

In the latter case, where the coating based on titanium oxide comprises titanium oxide mixed with another compound, the thin hydrophilic layer, optionally free of titanium oxide, may be an integral part of the coating based on titanium oxide and constitute the outermost surface thereof. A single deposition step is then sufficient to deposit the coating based on titanium oxide and the thin hydrophilic layer which surmounts it. It may be, by way of example, a coating comprising titanium oxide particles dispersed in a siliceous binder, the outermost surface (that is to say a few nanometers) being mainly composed of silica, or even being only composed of silica and therefore free of titanium oxide.

Mixed $TiO_2/SiO_2$ Layer with Concentration Gradient

A novel material that can be used according to the invention is a material composed of a substrate equipped with at least one layer whose surface forms at least part of the outer surface of said material, said layer comprising titanium oxide and silicon oxide. This material is characterized in that the titanium oxide content at said outer surface is non-zero and in that the silicon oxide content is higher at said outer surface than at the center of the layer.

In this embodiment of the invention, the coating based on titanium oxide and the thin hydrophilic layer form a single mixed layer (comprising titanium and silicon oxides), enriched at the surface with silicon oxide. The thin hydrophilic layer thus is an integral part of the coating based on titanium oxide and constitutes the outermost surface thereof.

The silicon oxide content at the outer surface of the layer is greater than the silicon oxide content at the center of the layer, and even advantageously greater than the silicon oxide content in the part of the layer closest to the substrate. The titanium oxide content at the outer surface is itself preferably less than the titanium oxide content at the center of the layer, or even less than the titanium oxide content in the part of the layer closest to the substrate.

Advantageously, the silicon oxide content increases continuously in the thickness of the layer from the center of the layer, especially from the part closest to the substrate, up to the outer surface. It is then possible to refer to layers that have a $SiO_2$ content gradient that increases in the thickness of the layer, or else mixed layers with a composition gradient. The term "continuously" should be understood, in the mathematical sense of the term, to mean that the $SiO_2$ content is a continuous function of the distance to the substrate. The $TiO_2$ content itself decreases in correlation with the thickness of the layer, from the center of the layer to the outer surface, preferably from the part closest to the substrate to the outer surface, continuously.

The silicon oxide content at the outer surface is advantageously greater than or equal to 5 wt %, or even 10 wt % or 15 wt %, and even 20 or 25 wt % and/or less than or equal to 50 wt %, or 40 wt %, or even 35 wt % or 30 wt %. The silicon oxide content at the center of the layer is itself preferably less than or equal to 15 wt %, or 10 wt % and even 5 wt %. These layers have a very marked enrichment of silicon oxide at the surface; however, contents that do not exceed 50 wt % are preferred as they make it possible to combine low dust accumulation with high photocatalytic activity and super-hydrophilicity, as explained in the remainder of the text. Even higher silicon oxide contents at the outer surface (more than 50%, or more than 70% and even more than 90%) make it possible to obtain an even lower level of dust accumulation, which is accompanied however by a degradation of the photocatalytic activity.

The layer according to the invention is preferably solely composed of titanium oxide and silicon oxide, apart from inevitable impurities (for example, elements originating from the substrate).

The thickness of the layer is preferably between 3 and 200 nm, or even between 3 and 100 nm. Thicknesses between 3 and 30 nm, especially between 5 and 20 nm and even between 5 and 15 nm are preferred. This is because, for thickness values that are too small, the desired effect of low dust accumulation is only slightly obtained. Thicknesses that are too large do not make it possible to improve this effect and generate a higher cost, a longer deposition time and an optical appearance of the layer that is too visible, in particular undesirable yellow tints. Large thicknesses, especially greater than or equal to 30 nm, or even 50 nm may be appreciated if a high photocatalytic activity is required, for example for applications as interior glazing, that receives little ultraviolet radiation.

The layer comprising titanium oxide and silicon oxide is advantageously the only layer conferring photocatalytic or self-cleaning properties on the material. In particular, the layer according to the invention is preferably not deposited itself on a photocatalytic layer based on titanium oxide as such a multilayer in no way improves the properties of the material.

Mixed $TiO_2/SiO_2$ layers have been described in the prior art, in particular in application WO 97/03029. This application specifically describes layers having a refractive index gradient that varies in the thickness of the layer and that decreases from the zone closest to the substrate to the zone closest to the surface. These layers, including mixed $TiO_2/SiO_2$ layers, are used as intermediate layers in multilayers for improving their optical appearance. They are surrounded by at least one electrically conductive or low-emissivity layer and therefore do not form the outer part of the material.

Process for Obtaining Mixed $TiO_2$/$SiO_2$ Layers Having a Composition Gradient The mixed layers having a composition gradient according to the invention may be obtained by the process described in WO 97/03029. This chemical vapor deposition (CVD) process uses a nozzle that extends transversely to the running axis of the substrate (in particular of the glass that is in the form of a ribbon obtained by the float glass process) and that has two slits for injection of precursor gases of different compositions and that are sized so that partial and gradual mixing between the two gas streams is produced in the deposition zone.

The inventors have however developed a chemical vapor deposition process that is more astute as it uses a conventional nozzle, that only has a single gas injection slit and makes it possible to obtain all sorts of mixed layers having a composition gradient, including the $TiO_2$/$SiO_2$ layers described above.

This process for chemical vapor deposition onto a substrate running along an axis, and using a nozzle that extends transversely to the running axis of said substrate and that has a single slit, is characterized in that at least two gaseous precursors that do not react together are injected simultaneously via said single slit, said precursors having decomposition temperatures that are intrinsically or extrinsically sufficiently different to form a layer in which the content of the oxide whose precursor has the lowest decomposition temperature decreases continuously in the thickness of the layer.

Another subject of the invention is a process for obtaining a material composed of a substrate equipped with at least one layer comprising titanium oxide and silicon oxide, according to which said layer is deposited by chemical vapor deposition (CVD) onto said substrate running along an axis, said deposition being carried out using a nozzle that extends transversely to the run axis of said substrate and that has a single slit, gaseous precursors of titanium oxide and of silicon oxide that do not react together being injected simultaneously via said single slit, and such that at least one titanium oxide precursor has a decomposition temperature that is intrinsically or extrinsically sufficiently lower than the decomposition temperature of at least one silicon oxide precursor to form a layer in which the silicon oxide content increases continuously in the thickness of the layer.

The inventors have actually realized that by a suitable choice of the precursors, and more specifically by a suitable choice of their respective decomposition temperatures, it was possible to obtain a layer having a composition gradient using a conventional chemical vapor phase deposition nozzle. When the decomposition temperatures are not sufficiently different from one another, a mixed layer is formed, which has a substantially homogeneous composition throughout the thickness of the layer. In the particular case of the $TiO_2$/$SiO_2$ layers according to the invention, too small a difference between the decomposition temperatures of the various precursors does not lead to the surface enrichment in silica that is desired and that is at the origin of good dust accumulation properties. The difference needed between the decomposition temperatures of the precursors obviously depends on a large number of parameters such as the chemical nature of the layers to be formed or the temperature of the substrate during the deposition. It must be adapted on a case by case basis by a person skilled in the art.

The decomposition temperatures of the precursors may be intrinsic to the chosen precursor, or be modified selectively by addition of a compound that inhibits, or alternatively accelerates, the deposition of the precursor.

The particular process in which the precursors are injected together is also preferred as the layers that it makes it possible to obtain are more effective in terms of anti-dust properties than the layers obtained by the process described in application WO 97/03029, probably due to a different microstructure.

For reasons of ease of use on an industrial scale, preferably a single titanium oxide precursor and a single silicon oxide precursor are injected. In order to obtain a layer having a well defined composition gradient, the difference between the respective decomposition temperatures of the titanium oxide and silicon oxide precursors is preferably at least 50° C., or 75° C., and even 100° C. or 150° C.

By way of example, the $TiO_2$ and $SiO_2$ precursors may respectively be tetraiospropyl titanate (TiPT) and tetraethoxysilane (TEOS), which have the advantages of being inexpensive and non-toxic. TiPT has a decomposition temperature of around 300° C., i.e. around 100 to 150° C. less than TEOS.

The respective amounts of $TiO_2$ and $SiO_2$ precursors introduced may be defined by the Ti/(Ti+Si) molar ratio calculated from the molar amounts of Ti and Si atoms introduced (present in the gas phase). This molar ratio is not found as is in the layer due to the differences in yield between the precursors.

This ratio is preferably between 0.85 and 0.96, especially between 0.90 and 0.93. This is because it has been noted that in this ratio range, the product obtained made it possible to combine the properties of low dust accumulation with a photocatalytic activity and a photoinduced super-hydrophilicity close to those of a product comprising a single layer of titanium oxide crystallized in anatase form.

When the Ti/(Ti+Si) ratio is higher, close to 1, the properties obtained approach those of a substrate coated by a single titanium oxide layer. The material obtained therefore has a high dust accumulation, and is consequently covered with mineral soiling in the absence of water runoff.

When, on the other hand, the Ti/(Si+Ti) ratio is lower, in particular around 0.7 or 0.8, or even less, the surface of the layer is highly enriched with silicon and the layers obtained have a substantially reduced, or even nonexistent, photocatalytic activity and even lose the photoinduced super-hydrophilicity character. This phenomenon could be due to the fact that the presence of silica in too high an amount within the mixed layer disturbs the titanium oxide crystallization properties, giving rise to amorphous layers or, in any case, layers that are not very crystalline. Such layers may nevertheless be used within the meaning of the present invention, as the dust (mineral soiling) is only slightly deposited and only slightly adheres to their surface. These layers, the surface of which is extremely enriched with silica but still has a high titanium oxide content, are therefore used all the same due to their ability not to be covered by mineral soiling.

The layers for which the Ti/(Si+Ti) molar ratio is optimized make it possible, on the other hand, to combine all the advantages: low dust accumulation (same level as for lower molar ratios), high photocatalytic activity and photoinduced super-hydrophilicity.

When the substrate is made of glass, and in particular when it is a sheet of glass formed by pouring molten glass onto a molten tin bath (process known as the "float" process), the chemical vapor deposition process is preferably carried out continuously, at the outlet of the float bath, on a substrate whose temperature is usually between 580° C. and 630° C.

Another subject of the invention is a material capable of being obtained by the process according to the invention described previously. The antisoiling properties obtained when the surface of the layer comprising silicon oxide and titanium oxide forms at least part of the outer surface of the material are, in effect, particularly attractive. Considering the difficulty in precisely studying the microstructure of the layers obtained according to this process, it is not however possible to structurally define these preferred materials. The various preferred characteristics of the material described previously (presence of a sublayer, thicknesses, etc.) also apply to this material.

The layers of the materials according to the invention may also be obtained by other deposition processes, for example a magnetically-enhanced sputtering process (magnetron sputtering process) in which the substrate is successively exposed to the bombardment originating from $TiO_2$ targets increasingly enriched with $SiO_2$.

Types of Substrates

The substrates used within the scope of the present invention may be of mineral nature, especially based on glass, ceramic or glass-ceramic, or else of organic nature. In the latter case, various rigid or flexible plastics may be used such as polymethyl methacrylate (PMMA), polycarbonate (PC), polypropylene, polyurethane, polyvinyl butyral, polyethylene glycol terephthalate, polybutylene glycol terephthalate, and ionomer resins such as a copolymer of ethylene/(meth) acrylic acid neutralized by a polyamine, a cycloolefin copolymer such as ethylene/norbornene or ethylene/cyclopentadiene copolymers, a poly-carbonate/polyester copolymer, an ethylene/vinyl acetate copolymer and the like, alone or as blends. Use may also be made of substrates obtained by polymerization of diethylene glycol bis(allyl carbonate) (sold under the trade mark CR39™ by PPG Industries Inc.), or substrates based on a (meth)allyl or (meth)acrylic polymer, (more particularly those obtained from monomers or prepolymers derived from bisphenol A, used alone or as a blend with other copolymerizable monomers), based on poly(thio)urethane, or else based on polystyrene or diallyl phthalate resin.

Sublayers

At least one sublayer is preferably inserted between the substrate and the coating based on titanium oxide. This sublayer is itself advantageously in contact with the substrate and/or the coating based on titanium oxide.

When the substrate contains elements capable of migrating to the inside of the layer based on titanium oxide and of disturbing its properties, it is, in effect, preferable to insert, between said substrate and said layer based on titanium oxide, a layer that forms a barrier to the migration of these elements. This is the case, in particular, when the substrate, for example when it is a sheet of sodium-lime silicate glass or a ceramic coated with a glaze, contains alkali metal ions such as lithium, potassium or sodium.

An alkali metal barrier sublayer is therefore preferably positioned directly under the coating based on titanium oxide, which has the role of preventing the migration of the alkali metal ions possibly contained in the substrate within the layer comprising titanium oxide. A barrier layer such as, for example, a layer comprising $SiO_2$, SiOC, $Al_2O_3$ or $SnO_2$ is particularly suitable for preserving the photocatalytic activity of the titanium oxide.

The alkali metal barrier sublayer is advantageously a layer of SiOC (silicon oxycarbide), preferably deposited by CVD (chemical vapor deposition) directly onto the substrate. The SiOC sublayer then advantageously has, on its surface, regularly spaced bumps that preferably have a width at the base of around 60 to 120 nm and a height of around 20 to 50 nm. This is because it has been observed that the technical effect which consists in preventing the deposition of mineral soiling on its surface was amplified when the deposition of the coating based on titanium oxide (especially when it is a mixed $TiO_2$/ $SiO_2$ having a concentration gradient) was carried out on such a textured surface. The reason for this is, for the time being, completely unexplained.

It may also be desirable to position at least one sublayer between the substrate and the coating based on titanium oxide, for example in order to reduce a reflection factor or a coloration in reflection that are judged to be too high. It may be, for example, a layer or a multilayer whose thicknesses and refractive indices are such that the assembly formed by these sublayers and the coating based on titanium oxide forms an anti-reflection multilayer, in the sense where the reflection factor obtained is less than that of the substrate.

Applications

The material according to the invention has the advantage of preventing the deposition of mineral soiling (dust accumulation) and therefore of not being soiled in the absence of water runoff, in particular during exposure that is outside but is sheltered from the rain, therefore when it is subjected to a cycle characterized by the alternation of solar illumination during the day and the absence of illumination during the night. It is during a cycle of several alternations, especially after several months of exposure (2, or 4 months, or more), that the advantage, relative to a substrate equipped with a photocatalytic coating that is uncoated or is based on $TiO_2$ alone, is revealed. Such situations are frequent, in particular in the case of buildings that have cornices, overhangs or sunshades in front of or above glazed walls, the latter therefore not being subjected to rainwater runoff. Use of the material in outside zones protected from the rain or in geographical zones that very rarely experience precipitation is therefore particularly advantageous.

Another subject of the invention is the use of a material according to the invention as a material that has the property of not being soiled when it is placed in outside exposure in zones that are protected from the rain or in geographical zones that very rarely experience precipitation.

The very recently discovered technical effect also enables use of the material inside a building, for example in the form of interior glazing or a display screen such as a screen of the LCD (Liquid Crystal Display), plasma or cathode-ray tube type, to prevent dust accumulation on the screen. It is also possible to use the material according to the invention inside a transport vehicle (motor vehicle, train, plane, etc.) for example, as a windshield or side window of a motor vehicle. It should furthermore be noted that the properties of the material according to the invention are not affected by toughening or bending.

The invention will be better understood with the aid of the following exemplary embodiments, which illustrate the invention without however limiting it.

EXAMPLE 1

A glazing panel, sold by Saint-Gobain Glass under the name SGG Bioclean™ and composed of a soda-lime silicate glass substrate equipped on one of its surfaces with a thin layer of SiOC acting as a barrier to the migration of alkali metals covered by a titanium oxide coating with a thickness of 15 nm, crystallized in anatase form and obtained by the chemical vapor deposition (CVD) process, served as comparative example C1. This glazing panel was of the self cleaning type in the presence of solar radiation and rainwater runoff due to the photocatalytic and super-hydrophilic properties of the titanium oxide, which enabled it to degrade the organic soiling and to remove the mineral soiling under water, especially rain, runoff.

A second comparative example (C2) was constituted by a glazing panel made of uncoated soda-lime silicate glass.

In order to produce example 1 according to the invention, the glazing panel from comparative example C1 was in turn coated with a very thin layer of silica doped with aluminum in an amount of 8 at %, deposited by the magnetically-enhanced sputtering process, sometimes referred to as "magnetron sputtering" process. The thickness of this unannealed thin hydrophilic layer was around 2 nm.

These three glazing panels were exposed to outside conditions for 4 months under a transparent canopy, consequently sheltered from the rain but not from solar radiation. They were subjected to a cycle characterized by the alternation of solar illumination during the day and the absence of illumination during the night.

After exposure, the three glazing panels were observed. The two comparative samples C1 and C2 both had a very large quantity of extremely adherent mineral dust on the exposed surface. The glazing panel according to the invention itself had no notable dust accumulation.

EXAMPLE 2

Deposited onto a soda-lime silicate glass substrate were an alkali metal barrier sublayer made of SiOC with a thickness of 50 nm via a chemical vapor deposition process starting from $SiH_4$, ethylene and optionally an oxidizing compound, according to the process described in application EP 0 518 755. This sublayer was naturally textured, and had, at its surface, bumps whose width at the base was around 100 nm and the height around 30 nm.

Deposited onto this sublayer were mixed layers of $TiO_2$ and $SiO_2$ via a chemical vapor deposition (CVD) process using a standard spray nozzle (equipped with a single slit). Injected through this single slit were the precursors of $TiO_2$ (tetraisopropyl titanate TiPT) and of $SiO_2$ (tetraethoxysilane, TEOS), the Ti/(Ti+Si) molar ratio in the gas phase varying as a function of the tests between 0.67 and 1. The value of 1 corresponded to the comparative test in which TEOS was not injected. The layers obtained had a thickness of around 9 to 12 nm depending on the tests.

Considering their small thickness and their particular texturization (due to the presence of the SiOC sublayer), it was difficult to elucidate, with precision, the structure of these layers. The Si/Ti molar ratio at the surface of the layer (the first nanometers) was measured by the method known as ESCA (Electron Spectroscopy for Chemical Analysis) also known as XPS (X-ray Photoelectron Spectroscopy). The local composition of the layers as a function of the thickness was studied by SIMS (Secondary Ion Mass Spectroscopy).

The following elements emerged from the latter study:
the layer for which the Ti/(Ti+Si) ratio was equal to 0.92, therefore weakly enriched with silicon, had a very low content of silicon oxide (at most a few percent by weight) at the center of the layer, this content greatly and continuously increasing on approaching the outer surface of the material, to reach around 25 to 30% by weight; and the layer for which the Ti/(Ti+Si) ratio was equal to 0.67 had a silicon oxide content of around 5 to 10% by weight at the center of the layer, this content greatly and continuously increasing on approaching the outer surface of the material, to reach around 70 to 75% by weight. The outermost surface of the layer therefore predominantly contained silica. The weight content of titanium oxide therefore decreased continuously in the thickness of the layer from the center (90-95%) to the surface (25-30%).

The photocatalytic, photoinduced hydrophilicity and dust accumulation properties were measured as described below.

The photocatalytic activity was determined by measuring the color variation, after exposure to ultraviolet radiation, of an ink layer deposited on the outer surface of the material. This ink, described in application EP 1 601 462, was composed of a colored indicator such as methylene blue, a sacrificial electron donor organic molecule and a neutral polymer matrix, and had the particularity of detecting redox reactions at the surface of the titanium oxide and of changing color as a function of the intensity of these reactions. The irradiation of the titanium oxide in effect generated an electron-hole pair, the electron having made the colored indicator react via a reduction reaction and the hole having recombined with an electron originating from the electron donor organic molecule. A few drops of ink were deposited on the surface of the material then a sheet of glass that was transparent to ultraviolet radiation was sealed over said surface so that the ink covered the entire surface homogeneously. During irradiation of the surface via ultraviolet radiation, the color variation of the ink was quantified by spectrophotometry in terms of variation of the component a* in the La*b* color-measuring system. The results were expressed in arbitrary units taking the comparative example in which the silica precursor was not injected as the base (value fixed arbitrarily at 100).

The dust accumulation, or the ability of the material to be covered with mineral soiling adhering to its surface, was measured as follows. The samples were irradiated for 10 hours by ultraviolet radiation (UV-A type, power 30 $W/m^2$) to activate their surface (make it hydrophilic). In an environmental chamber in the absence of UV illumination, the surface of the samples was then covered with calcium carbonate particles of less than 50 microns in diameter that simulated dust. After 15 minutes, the material was placed in a vertical position to remove the excess dust and the surface was then cleaned using a compressed air jet, so that only the dust adhering remained on the surface of the material. This procedure was repeated cumulatively up to six repeats at a rate of one test per hour then the percentage of the surface still occupied by dust was measured by image analysis techniques. The comparative sample (corresponding to a Ti/(Ti+Si) ratio of 1) being taken as the reference (base 100), the results were expressed as a percentage of the surface still occupied by adherent dust relative to this reference.

The photoinduced hydrophilicity properties were determined by measurements of the water contact angle. Two types of measurement were carried out: measurements taken after illumination by ultraviolet radiation then storage for 1 to 7 days in darkness, and measurements taken after an exposure time to ultraviolet rays ranging from 15 minutes to 26 hours.

Table 1 below collates the results of the photocatalytic activity and dust accumulation of the various examples. Tables 2 and 3 for their part collate the hydrophilicity results.

TABLE 1

| Gas phase Ti/(Ti + Si) | Surface Si/Ti | Photocatalytic activity | Dust accumulation |
|---|---|---|---|
| 1 | — | 100 | 100 |
| 0.92 | 0.25-0.5 | 60 | 40 |
| 0.85 | 0.5 | 20 | 46 |
| 0.79 | 0.7-1 | 10 | 35 |
| 0.72 | 1.25 | 2 | 35 |
| 0.67 | 2 | 2 | 35 |

TABLE 2

| Gas phase | Contact angle after X days of darkness | | | | |
|---|---|---|---|---|---|
| Ti/(Ti + Si) | X = 1 | X = 2 | X = 3 | X = 4 | X = 7 |
| 1 | 9 | 13 | 21 | 20 | 21 |
| 0.92 | 14 | 21 | 21 | 29 | 27 |
| 0.85 | 42 | 44 | 50 | 50 | 51 |
| 0.79 | 38 | 40 | 49 | 53 | 45 |
| 0.72 | 43 | 53 | 53 | 52 | 55 |
| 0.67 | 48 | 50 | 53 | 56 | 59 |

TABLE 3

| Gas phase | Contact angle after new UV exposure | | | |
|---|---|---|---|---|
| Ti/(Ti + Si) | 15 min. | 30 min. | 90 min. | 26 hours |
| 1 | 0.5 | 0.5 | 0.5 | 0.5 |
| 0.92 | 22 | 0.5 | 0.5 | 0.5 |
| 0.85 | 45 | 45 | 55 | 51 |
| 0.79 | 53 | 55 | 50 | 48 |
| 0.72 | 53 | 54 | 57 | 55 |
| 0.67 | 52 | 55 | 58 | 54 |

These results show that an enrichment of the silica layer considerably improves the dust accumulation properties, in the sense where two or three times less dust adheres to the surface of the material compared to the case where the layer only comprises titanium oxide. This effect is still obtained for small amounts of silicon precursors introduced (Ti/(Ti+Si) ratio of 0.92, i.e. only 8 mol % of silicon), therefore for low silicon contents in the mixed layer; the subsequent increase in the silicon content only has a small effect on this property. On the other hand, the presence of silicon in the layer rapidly degrades its photocatalytic activity, until practically canceling it out. The effects of low dust accumulation and photocatalytic activity are therefore completely decorrelated. It can also be noted that the addition of a silicon precursor very significantly increases the Si/Ti ratio at the surface of the material, this ratio being equal to around 2 when the silicon precursor is only added in an amount equal to half the titanium precursor content.

In terms of hydrophilicity, table 2 shows that the sample for which the Ti/(Ti+Si) ratio is 0.92 has a photoinduced hydrophilic character that decreases when the material is subjected to a long period of darkness, to an extent comparable to the performance of the comparative sample that is free of silicon. The hydrophilicity may then be again rapidly obtained by subjecting the sample to ultraviolet radiation (table 3). On the other hand, the addition of higher silicon contents in the layer very substantially degrades the photoinduced hydrophilicity properties since the samples for which the Ti/(Ti+Si) ratio is 0.85 or less are hydrophobic and remain so even after a new illumination under ultraviolet radiation (see table 3). These results therefore again demonstrate that the low dust accumulation of the materials according to the invention is completely independent of the photoinduced hydrophilicity properties.

The materials according to the invention therefore have the property of preventing or at least slowing down the deposition of mineral soiling on their surface. When low silicon contents are used, this property is moreover coupled with the known properties of the titanium oxide which are the photocatalysis and the photoinduced hydrophilicity. Such materials are therefore particularly desirable due to their property of not being soiled when they are placed in outside exposure in zones protected from the rain or in geographical zones that very rarely experience precipitation.

The preceding description makes it possible to illustrate some possible embodiments of the invention. It is clearly understood that this description is not however limiting and that a person skilled in the art is able to achieve other variants of the invention without however going outside the scope thereof.

The invention claimed is:

1. A material comprising a substrate equipped with at least one layer wherein a surface of said at least one layer forms at least one part of the outer surface of said material, said layer comprising titanium oxide and silicon oxide, and an SiOC sublayer is positioned directly under the layer comprising titanium oxide and silicon oxide, wherein the SiOC sublayer has, on its surface, regularly spaced bumps that have a width at the base of about 60 to 120 nm and a height of about 20 to 50 nm, wherein the titanium oxide content at said outer surface is non-zero and in that the silicon oxide content is higher at said outer surface than at the center of the layer.

2. The material as claimed in claim 1, wherein the silicon oxide content increases continuously in the thickness of the layer from the center of the layer up to the outer surface.

3. The material as claimed in claim 1, wherein the thickness of the layer is between 3 and 30 nm.

4. The material as claimed in claim 1, wherein the silicon oxide content in the part of the layer closest to the substrate is non-zero.

5. The material as claimed in claim 1, wherein the substrate is made of glass.

6. A glazing panel or display screen incorporating at least one material as claimed in claim 5.

7. The material as claimed in claim 1, wherein the thickness of the layer is between 5 and 20 nm.

8. A glazing panel or display screen incorporating at least one material as claimed in claim 1.

9. A process for obtaining a material comprising a substrate equipped with at least one layer comprising titanium oxide and silicon oxide, and an SiOC sublayer positioned directly under the layer comprising titanium oxide and silicon oxide, wherein said layer comprising titanium dioxide and silicon oxide and the SiOC sublayer are deposited by chemical vapor deposition (CVD) onto said substrate running along an axis, said deposition being carried out with a nozzle that extends transversely to the run axis of said substrate and that has a single slit, gaseous precursors of titanium oxide and of silicon oxide that do not react together are injected simultaneously via said single slit, and wherein at least one titanium oxide precursor has a decomposition temperature that is intrinsically or extrinsically sufficiently lower than the decomposition temperature of at least one silicon oxide precursor to form a layer in which the silicon oxide content increases continuously in the thickness of the layer, wherein the SiOC sublayer has, on its surface, regularly spaced bumps that have a width at the base of about 60 to 120 nm and a height of about 20 to 50 nm.

10. The process as claimed in claim 9, wherein a single titanium oxide precursor and a single silicon oxide precursor are injected.

11. The process as claimed in claim 10, wherein the difference between the respective decomposition temperatures of the titanium oxide and silicon oxide precursors is at least 50° C.

12. The process as claimed in claim 11, wherein the silicon oxide and titanium oxide precursors are respectively tetraethoxysilane and tetraisopropyl titanate.

13. The process as claimed in claim 9, wherein the Ti/(Ti+Si) molar ratio calculated from the molar amounts of Ti and Si atoms introduced, and that are present in the gas phase, is between 0.85 and 0.96.

14. A material obtained according to the process of claim 9.

15. The process as claimed in claim 9, wherein the Ti/(Ti+Si) molar ratio calculated from the molar amounts of Ti and Si atoms introduced, and that are present in the gas phase, is between 0.90 and 0.93.

* * * * *